United States Patent
Su et al.

(10) Patent No.: US 10,051,246 B2
(45) Date of Patent: Aug. 14, 2018

(54) STOPPED OBJECT DETECTION

(71) Applicant: Pelco Inc., Clovis, CA (US)

(72) Inventors: Wei Su, Clovis, CA (US); Lei Wang, Clovis, CA (US); Farzin Aghdasi, Clovis, CA (US); Shu Yang, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 188 days.

(21) Appl. No.: 14/850,709

(22) Filed: Sep. 10, 2015

(65) Prior Publication Data

US 2015/0381950 A1 Dec. 31, 2015

Related U.S. Application Data

(62) Division of application No. 12/976,957, filed on Dec. 22, 2010, now Pat. No. 9,154,747.

(51) Int. Cl.
*G06T 7/00* (2017.01)
*H04N 7/18* (2006.01)
(Continued)

(52) U.S. Cl.
CPC ......... *H04N 7/185* (2013.01); *G06K 9/00778* (2013.01); *G06K 9/6202* (2013.01); *G06T 7/11* (2017.01); *G06T 7/254* (2017.01); *H04N 7/183* (2013.01); *G06T 2207/10016* (2013.01); *G06T 2207/20081* (2013.01); *G06T 2207/30232* (2013.01); *G06T 2207/30236* (2013.01); *G06T 2207/30242* (2013.01)

(58) Field of Classification Search
CPC ..... G06T 7/11; G06K 9/00778; G06K 9/6202

USPC .......................................... 348/143
See application file for complete search history.

(56) References Cited

U.S. PATENT DOCUMENTS 6,445,409 B1 * 9/2002 Ito .......................... G01S 3/783
                                                                  348/155
6,798,908 B2    9/2004 Miyatake et al.
(Continued)

FOREIGN PATENT DOCUMENTS

EP        1978470 A1    10/2008

OTHER PUBLICATIONS

State Intellectual Property Office of the P.R.C. (SIPO) 2nd Office Action and Search Report for Application No. 201180061335.9 dated Nov. 5, 2015, 10 pgs.
(Continued)

*Primary Examiner* — Jeffery Williams
(74) *Attorney, Agent, or Firm* — Locke Lord LLP (57) ABSTRACT

A video surveillance system includes: an input configured to receive indications of images each comprising a plurality of pixels; a memory; and a processing unit communicatively coupled to the input and the memory and configured to: analyze the indications of the images; compare the present image with a short-term background image stored in the memory; compare the present image with a long-term background image stored in the memory; provide an indication in response to an object in the present image being disposed in a first location in the present image, in a second location in, or absent from, the short-term background image, and in a third location in, or absent from, the long-term background image, where the first location is different from both the second location and the third location.

17 Claims, 5 Drawing Sheets

(51) Int. Cl.
  *G06K 9/00* (2006.01)
  *G06K 9/62* (2006.01)
  *G06T 7/11* (2017.01)
  *G06T 7/254* (2017.01)

(56) References Cited

U.S. PATENT DOCUMENTS

| | | |
|---|---|---|
| 2005/0073585 A1 | 4/2005 | Ettinger et al. |
| 2007/0274402 A1 | 11/2007 | Ibrahim et al. |
| 2008/0158361 A1 | 7/2008 | Itoh et al. |
| 2008/0231709 A1 | 9/2008 | Brown et al. |
| 2009/0033745 A1* | 2/2009 | Yeredor ............... G01S 3/7864 348/152 |
| 2010/0296698 A1 | 11/2010 | Lien et al. |

OTHER PUBLICATIONS

IP Australia 1st Examination Report for Application No. 2011349259, dated Mar. 24, 2016, 3 pgs.
International Search Report & Written Opinion of the International Searching Authority (KR) dated May 30, 2012 for International Application No. PCT/US2011/066204, 8 pgs.
International Preliminary Report on Patentability for International Application No. PCT/US2011/066204, dated Jul. 4, 2013, 7 pgs.
State Intellectual Property Office of the P.R.C. (SIPO) 1st Office Action and Search Report for Application No. 201180061335.9 dated Feb. 28, 2015, 8 pgs.
Extended European Search Report (European Search Report & European Search Opinion) dated Nov. 13, 2015 for European Application No. EP11851532, 8 pgs.

* cited by examiner

STOPPED OBJECT DETECTION

CROSS-REFERENCE TO RELATED APPLICATIONS

This application claims benefit of U.S. application Ser. No. 12/976,957, filed Dec. 22, 2010, entitled "STOPPED OBJECT DETECTION," the entire contents of which are hereby incorporated herein by reference.

BACKGROUND

Increasingly, many aspects of our lives are monitored and recorded. For example, video surveillance is prevalent, recording scenes for news, general information, and security purposes. Security cameras record visual information of desired locations such as banks, storefronts, automatic teller machines, businesses, roadways, parks, etc.

Video recordings are used for a variety of purposes. Persons whose images are captured can be used to help identify and locate the persons, e.g., if they have committed a crime. Unexpected events can be captured by constantly-monitoring cameras that would otherwise not be captured, and the events viewed, e.g., on television or through the internet. Further, video can be analyzed for particular events or characteristics, such as stopped vehicles.

Analyzing video recordings for stopped vehicles has several applications. For example, a video device capturing video of a roadway may be analyzed for stopped vehicles in order to alert services such as the police, the fire department, and/or roadside assistance. Further, locations where vehicles are prohibited from stopping may be monitored in order to determine if a vehicle has stopped in an undesired location. Stopped vehicles may be of concern for a variety of reasons such as that the vehicle is blocking a fire lane, or that the vehicle may pose a terrorist threat.

SUMMARY

An example of a video surveillance system includes: an input configured to receive indications of images each comprising a plurality of pixels; a memory; and a processing unit communicatively coupled to the input and the memory and configured to: analyze the indications of the images; compare the present image with a short-term background image stored in the memory; compare the present image with a long-term background image stored in the memory; provide an indication in response to an object in the present image being disposed in a first location in the present image, in a second location in, or absent from, the short-term background image, and in a third location in, or absent from, the long-term background image, where the first location is different from both the second location and the third location.

Implementations of such a system may include one or more of the following features. The processing unit is further configured to: update the short-term background image using the present image in response to lack of motion in images during a preceding short-term time threshold; and update the long-term background image using the present image in response to lack of motion in images during a preceding long-term time threshold. The processing unit is configured to actuate an alarm in response to the indication only if the object is larger than a size threshold. The processing unit is configured to actuate an alarm in response to the indication only if the object is within a size range. The processing unit is configured to actuate an alarm in response to the indication only in response to the first location being different from each of the second location and the third location by at least a movement threshold. The system is a camera, the camera further including a video capture device configured to convert reflected light into the indications of the images, and where the input is communicatively coupled to the video capture device to receive the indications of the images from the video capture device. The system further includes a user interface communicatively coupled to the processing unit and configured to provide an alarm in response to the indication.

An example of a stopped object detection system includes: capturing means for capturing images of an area; background means, communicatively coupled to the capturing means, for storing a short-term background image and a long-term background image; motion detection means, communicatively coupled to the capturing means, for determining that an object is an in-motion object based on images captured by the capturing means; and stopped object detection means, communicatively coupled to the motion detection means and the background means, for determining that a previously-moving object has stopped by comparing current-image information with the short-term background image and the long-term background image.

Implementations of such a system may include one or more of the following features. The system further includes small-motion means, communicatively coupled to the motion detection means, for determining whether an amount of motion of the in-motion object is less than a threshold motion. The system further includes object size means, communicatively coupled to the motion detection means, for determining whether the in-motion object is of a size that is within a range of sizes of concern. The stopped object detection means are further for determining that the previously-moving object has stopped only if the previously-moving object is in a first location in the present image, in a second location in, or absent from, the short-term background image, and in a third location in, or absent from, the long-term background image, where the first location is different from both the second location and the third location. The stopped object detection means are further for determining whether the previously-moving object is within a zone of concern of the images. The stopped object detection means are further for triggering an alarm in response to the previously-moving object being stopped for longer than an alarm-triggering threshold within the zone of concern. The background means are further for updating the short-term background image with the previously-moving object. The background means are for updating the short-term background image with the previously-moving object after a threshold amount of time that depends upon a size of the previously-moving object.

An example of a method for detecting a stopped object includes: capturing images of an area using a camera; producing a short-term background image and a long-term background image using the captured images; determining that an object is an in-motion object based the captured images; and producing a stopped-object indication in response to determining that a previously-moving object has stopped by comparing current-image information with the short-term background image and the long-term background image.

Implementations of such a method may include one or more of the following features. The method further includes determining whether an amount of motion of the in-motion object is less than a threshold motion. The method further includes determining whether the in-motion object is of a size that is within a range of sizes of concern. Determining that the previously-moving object has stopped includes determining whether the previously-moving object is in a first location in the present image, in a second location in, or absent from, the short-term background image, and in a third location in, or absent from, the long-term background image, where the first location is different from both the second location and the third location. The method further includes determining whether the previously-moving object is within a zone of concern of the images. The method further includes actuating an alarm in response to the previously-moving object being stopped for longer than an alarm-triggering threshold within the zone of concern.

An example of a computer program product residing on a non-transitory processor-readable medium includes instructions configured to cause a processor to: produce a short-term background image and a long-term background image from images captured by a camera; determine that an object is an in-motion object based on the captured images; determine that a previously-moving object has stopped by comparing current-image information with the short-term background image and the long-term background image; and produce a stopped-object indication in response to determining that the previously-moving object has stopped.

Implementations of such a computer program product may include one or more of the following features. The computer program product further includes instructions configured to cause the processor to determine whether an amount of motion of the in-motion object is less than a threshold motion. The computer program product further includes instructions configured to cause the processor to determine whether the in-motion object is of a size that is within a range of sizes of concern. The instructions configured to cause the processor to determine that the previously-moving object has stopped include instructions configured to cause the processor to determine whether the previously-moving object is in a first location in the present image, in a second location in, or absent from, the short-term background image, and in a third location in, or absent from, the long-term background image, where the first location is different from both the second location and the third location. The computer program product further includes instructions configured to cause the processor to determine whether the previously-moving object is within a zone of concern of the images. The computer program product further includes instructions configured to cause the processor to actuate an alarm in response to the previously-moving object being stopped for longer than an alarm-triggering threshold within the zone of concern.

Items and/or techniques described herein may provide one or more of the following capabilities, and/or other capabilities not mentioned. Stopped vehicles may be detected with a lower error rate than with existing techniques. Small movement of a vehicle that has triggered a stopped-vehicle indication can be ignored instead of triggering a new stopped-vehicle indication. Further, it may be possible for an effect noted above to be achieved by means other than that noted, and a noted item/technique may not necessarily yield the noted effect.

DETAILED DESCRIPTION

Techniques are provided for detecting stopped objects, such as vehicles. For example, a surveillance system includes a camera configured to detect motion of an object in an image. The camera monitors the moving object to determine whether the object stops. If the object stops for longer than a short-term threshold time, the camera stores a short-term background image including the stopped vehicle. If the object stops for longer than a long-term threshold time, the camera stores a long-term background image including the stopped vehicle. The camera analyzes the short- and long-term background images relative to a present image captured by the camera. If the present image compared with the background images indicates that the object moved relative to both the short- and long-term background images, then an alert that the object has moved is triggered, and otherwise no alert is triggered to indicate that this object has moved. Other examples are included in the following description. For example, while the discussion above focused on a camera storing and analyzing images, these functions may be performed remotely from the camera, e.g., in a server, or all or parts of these functions may be divided between the camera and another device such as a remote server.

Figure 1:
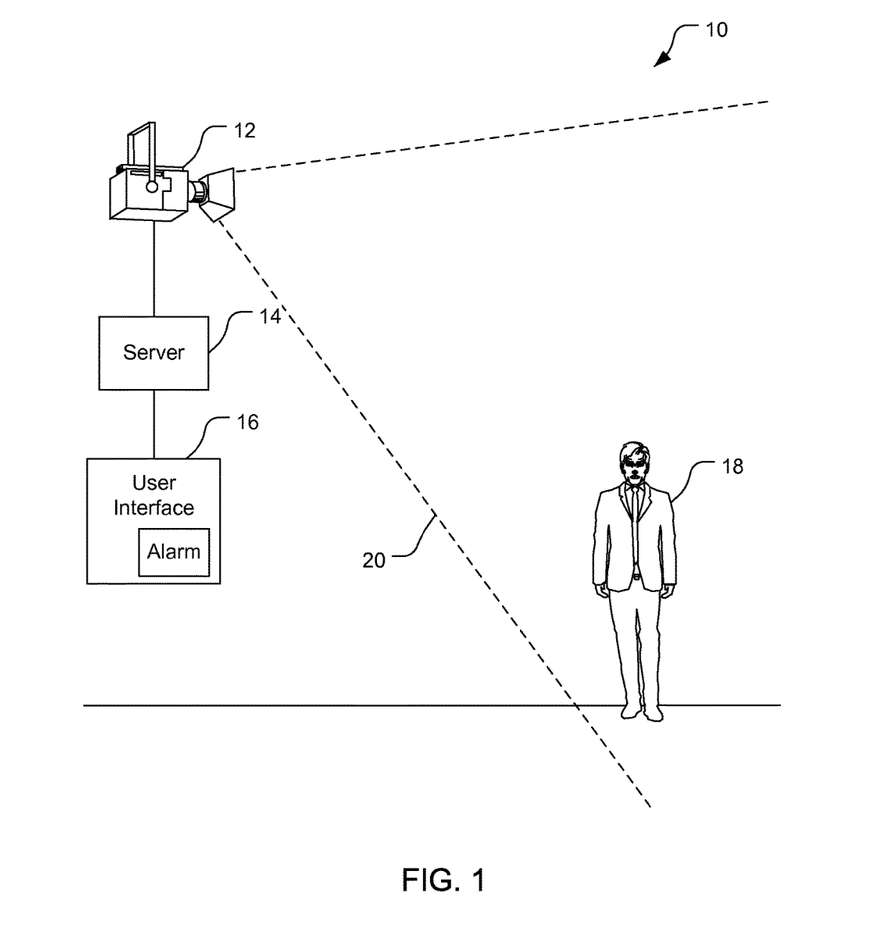
FIG. 1 is a schematic diagram of a video surveillance system.

Referring to FIG. 1, a security camera network 10 includes a camera 12, a server 14, and a user interface 16. The camera 12 is configured to capture images of objects, such as a person 18, disposed within a field of view 20 of the camera 12. The camera 12 may be a fixed-position camera, PTZ (Pan-Tilt-Zoom) camera, or other type of camera. Further, while only one camera 12 is shown, the system 10 may include more than one camera. The camera is communicatively connected (e.g., with a wired and/or wireless connection) to the server 14 that is communicatively connected to the user interface 16. The interface 16 includes a display and speakers to provide visual and audio information to a user.

The camera 12 has an associated point of view and the field of view 20. The point of view is the position and perspective from which a physical region is being viewed by the camera 12. The field of view 20 is the physical region captured in frames by the camera 12.

Figure 2:
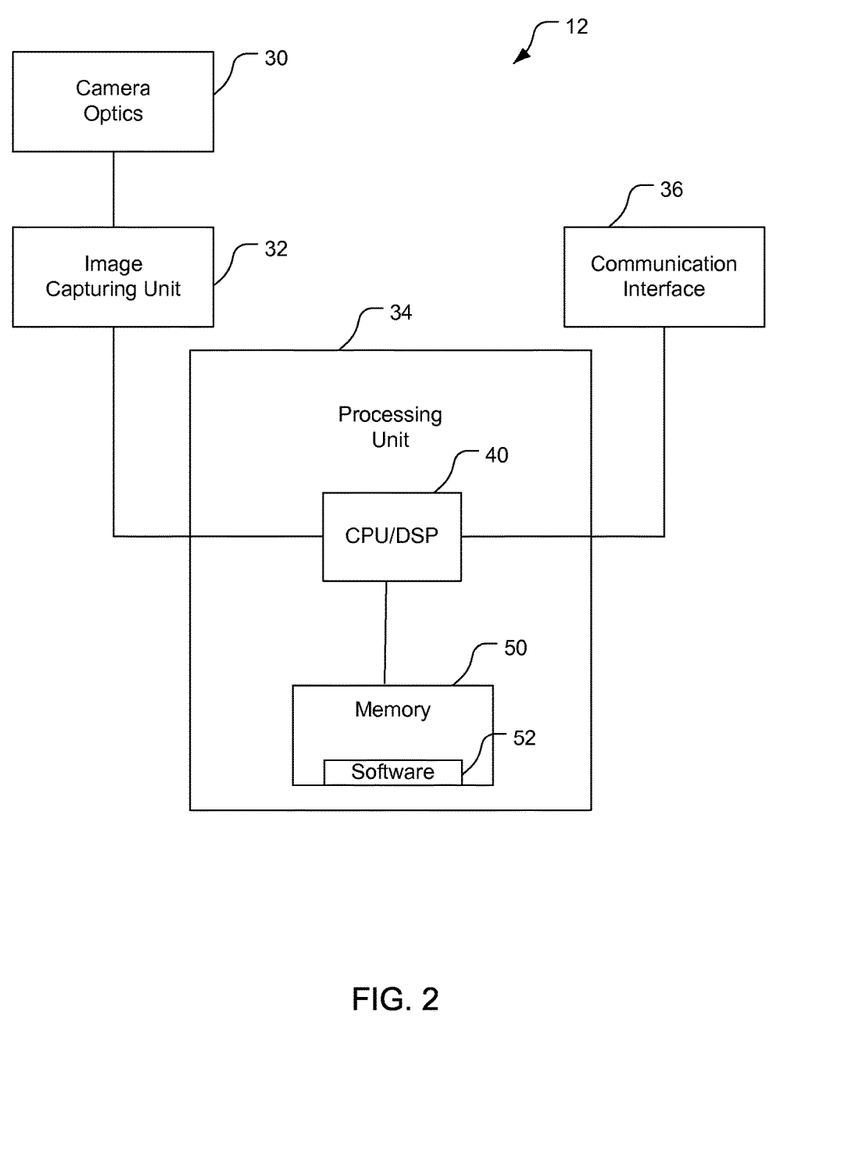
FIG. 2 is a block diagram of components of a camera of the video surveillance system shown in FIG. 1.

Referring to FIG. 2, the camera 12 includes camera optics 30, an image capturing unit 32, a processing unit 34, and a communication interface 36. The image capturing unit comprises lenses and other optical components, and is communicatively coupled with the image capturing unit 32. The image capturing unit 32 includes a charge-coupled device (CCD) and/or other technology to convert optical images into electrical information that is transferred to the processing unit 34. Also coupled with the processing unit 34 is the communication interface 36 through which information is sent to and received from the server 14, e.g., through a communication network such as a local area network, a wide area network, a wireless network, etc.

The processing unit 34 processes image information and includes a central processing unit (CPU) or digital-signal processor (DSP) 40 and memory 42. The CPU/DSP 40 is preferably an intelligent device, e.g., a personal computer central processing unit (CPU) such as those made by Intel® Corporation or AMD®, a microcontroller, an application specific integrated circuit (ASIC), etc. DSPs, such as the DM6446 made by Texas Instruments®, can also be used. The CPU/DSP 40 is coupled to the memory 42 that includes random access memory (RAM) and read-only memory (ROM). The memory 42 is non-transitory and preferably stores machine-readable, machine-executable software code 44 containing instructions that are configured to, when executed, cause the CPU/DSP 40 to perform various functions described herein. Alternatively, the software 44 may not be directly executable by the processor CPU/DSP 40 but is configured to cause the processor CPU/DSP 40, e.g., when compiled and executed, to perform functions described herein.

Figure 3:
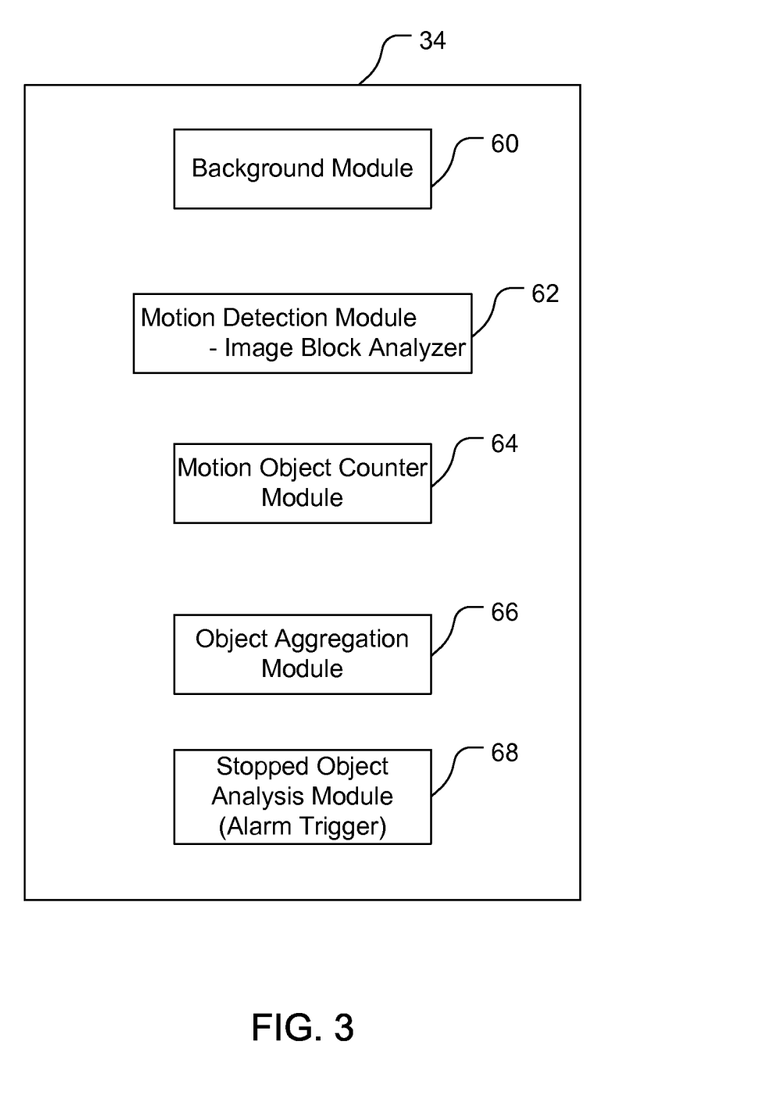
FIG. 3 is a functional block diagram of a processing unit shown in FIG. 2.

Referring also to FIG. 3, the processing unit 34 includes function blocks of a background module 60, a motion detection module 62, a motion object counter module 64, an object aggregation module 66, and a stopped object analysis module 68. The background module is configured to develop background images as further discussed below. The background images are composite images of video data for persistent objects in the field of view 20 of the camera 12 that are not of concern for determining stopped objects. For example, persistent objects include, but are not limited to, roads, bushes, trees, buildings, streams, lakes, flagpoles and flags, road signs, and bridges. The motion detection module 62 is configured to analyze images provided by the image capture unit 32 to determine whether an object within the field of view 20 is moving. The module 62 includes an image block analyzer configured to analyze blocks of the images to determine whether each block includes motion pixels, i.e., pixels indicating motion in the image. The motion object counter module 64 is configured to increase or decrease counters for blocks of images in which various objects are determined to be moving. Here, the module 64 maintains three counters for each of several blocks for each image. Each counter corresponds to a particular color found to be in a motion block (described further below). The object aggregation module 66 is configured to group sets pixels representing moving objects where the sets of pixels are closely spaced and thus likely to represent one object. The stopped object analysis module 68 is configured to use information from the other modules to determine whether a moving object meets relevant criteria, e.g., is of a relevant size, has moved a relevant distance, and has stopped for a relevant amount of time, and to trigger an alarm 17, of the user interface 16 (FIG. 1), in response to an object meeting the relevant criteria. The operation of these modules is discussed further below.

Figure 4:
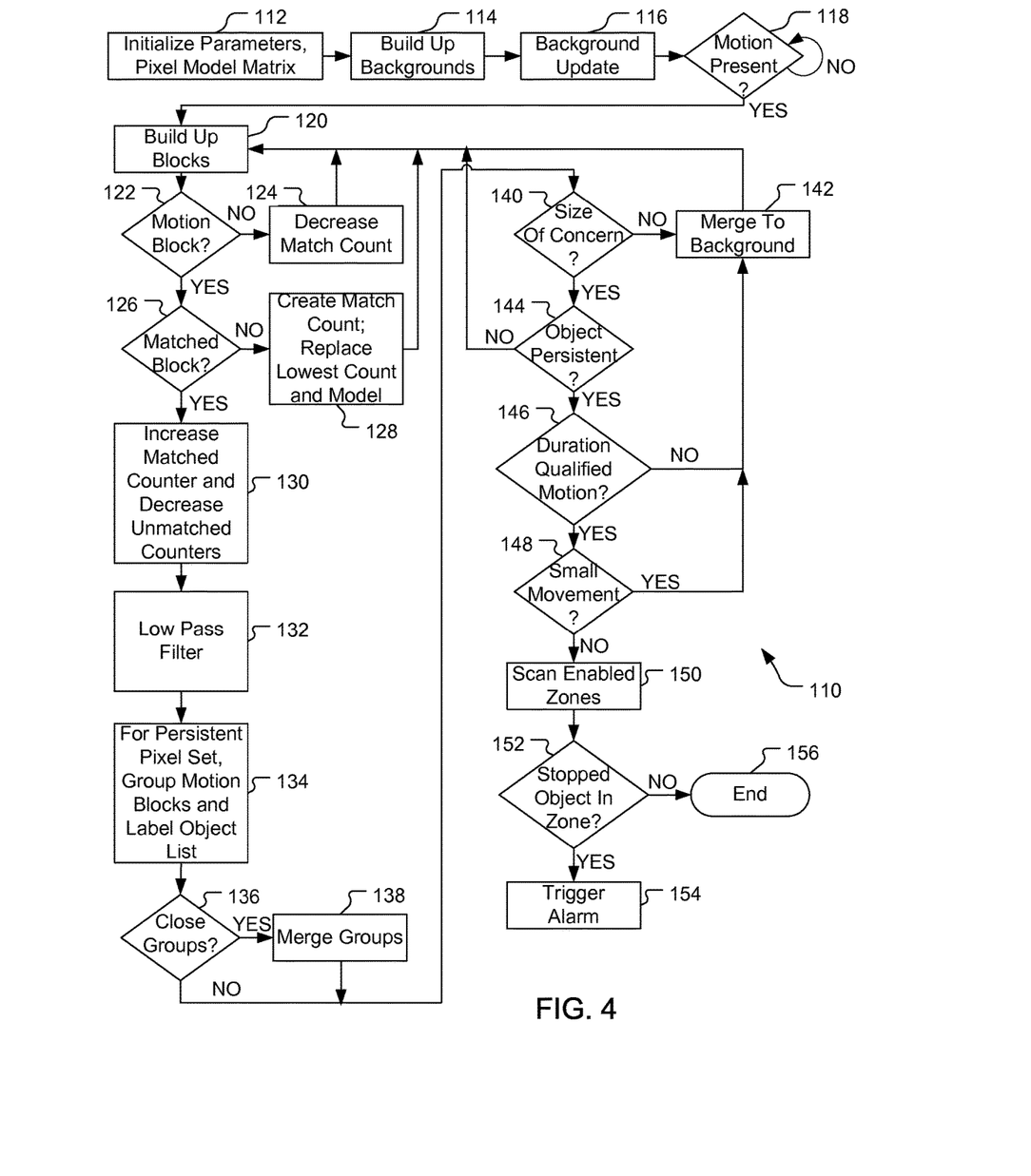
FIG. 4 is a block flow diagram of a process of detecting a stopped object and triggering an alarm.

Referring to FIG. 4, with further reference to FIGS. 1-3, a process 110 of detecting and alerting of a stopped object includes the stages shown. The process 110 is, however, an example only and not limiting. The process 110 can be altered, e.g., by having stages added, removed, rearranged, combined, and/or performed concurrently.

Background Establishment

At stage 112, parameters used by the processing unit 34 and a pixel model matrix are initialized. The parameters can be set by the processing unit 34, e.g., by the unit 34 retrieving the initial parameter values from the memory 50. One or more parameters may be input by a user through the user interface 16, and transferred via the server 14 and the communication interface 36 to the processing unit 34. The parameters include, e.g., an amount of time for building background images, an amount of time to trigger an alarm, an amount of time an object is to be stopped before an alarm is triggered, a size range of an object to be eligible for triggering an alarm, and other parameters including those discussed below. Further, for the pixel model matrix initialization, short-term and long-term background images are set to default values, e.g., with all pixel values set to zero.

At stage 114, the processing unit 34 builds the short-term and long-term backgrounds. The processing unit 34 receives information regarding objects in the field of view 20 of the camera 12 and stores values for the pixels in the images. Each pixel will typically have a Gaussian distribution of intensity values.

Figure 5:
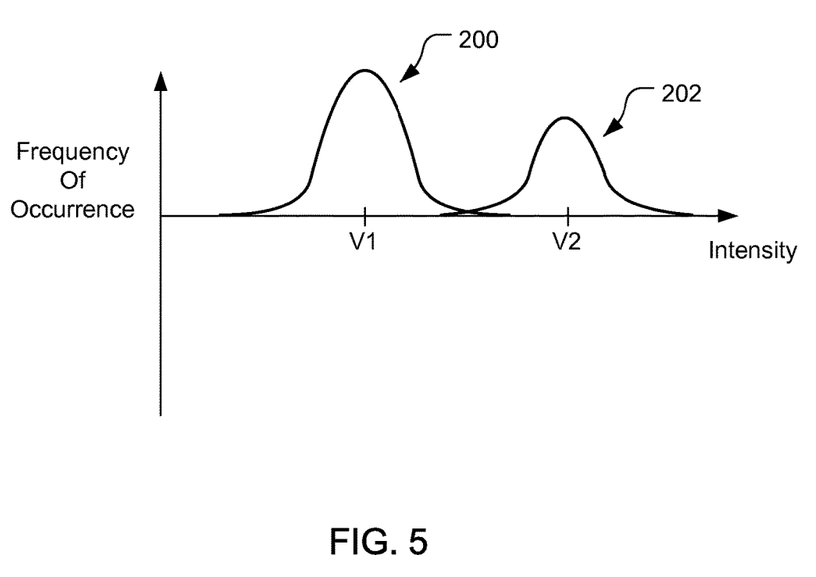
FIG. 5 is a plot of Gaussian distributions of pixel intensities.

Referring also to FIG. 5, a given pixel has an intensity distribution 200 with the pixel having an intensity value V1 most often, and intensity values near V1 distributed in a Gaussian fashion. As shown, the particular pixel also sometimes has an intensity value V2 with a corresponding Gaussian distribution 202 around this value. The distribution 202 is less likely, with the pixel having the values near V2 less often than those around V1.

The processing unit 34 is configured to analyze the incoming image information from the camera 12 and to store up to three distributions for each pixel in the memory 50 in a combined, mixture model. The processing unit 34 stores the three most favorable pixel intensity value distributions. If the value for a particular pixel in an incoming image falls in one of the Gaussian models (distributions), then the probability of occurrence is increased for the corresponding Gaussian model and the pixel value is updated with the running average value. If no match is found for the value of a pixel in an incoming image, then a new model replaces the least probable Gaussian model in the mixture model. As this computation is time consuming, preferably after a predetermined time, specified or otherwise initialized in stage 110, the mixture model is reduced to a Gaussian model by taking only the most probable distributions to represent the background pixels. The processing unit 34 stores two background images, a short-term background and a long-term background. The generation of the background images is particularly useful in crowded fields of view where background pixels appear infrequently or for a short period of time, interrupted by frequent foreground objects.

Also at stage 114, an analysis is also performed by the background module 60 regarding the video quality. If the video quality is undesirably low or the lighting condition changes quickly between images, then the short-term background is reset.

Background Update

At stage 116, the backgrounds are updated. Here, the short-term and long-term backgrounds are updated periodically, with the frequency of update being different for the two different backgrounds, the short-term background being updated frequently and the long-term background being updated less often. The different update frequencies/periods can be user specified in stage 112. The update periods preferably based upon the application, e.g., with a highway application looking for stopped vehicles possibly having longer update periods than an application for a no-parking zone adjacent a bank or other high-security facility. As an example, the short-term update rate could be on the order of several seconds and the long-term update rate could be many minutes, e.g., 20 minutes, 60 minutes, etc.

The background module 60 uses the Gaussian model to update each background pixel from time to time for use in segmenting motion pixels from background pixels. A pixel that has an intensity difference smaller than $s \cdot \sigma$ will be taken by the processing unit 34 as a background pixel, where s is a user-selected (stage 112) sensitivity and $\sigma$ is a Gaussian standard deviation. The processing unit 34 linearly adds the current background pixel intensity value to an accumulated value and modifies the standard deviation accordingly. The new background value and its standard deviation will be the average of the accumulated values.

Motion Detection

At stage 118, the processing unit 34 analyzes the images for indications of motion. To determine whether there is motion in the images, the motion detection module 62 compares each incoming image (frame) with the short-term background and the long-term background. The processing unit 34 compares, pixel by pixel, the present image with the two backgrounds to segment motion in the images. If the processing unit 34 determines that there is no motion, then the stage 118 repeats. If the processing unit 34 determines that there is motion compared to the short-term and long-term backgrounds, then the process 110 proceeds to stage 120.

At stage 120, the motion detection module 62 analyzes the present image for motion. The motion analysis is block based with a block size of pixels specified by the user at stage 112, e.g., 8×8 blocks of pixels. An initial motion image is obtained from stage 118 where pixels with an intensity difference, compared to the backgrounds, greater than s·σ are taken as foreground pixels, although some of these differences will be due to noise. The motion detection module 62 analyzes each block of the image for pixels with greater than s·σ intensity differences.

At stage 122, the image block analyzer of the motion detection module 62 determines, for each image block, whether the block is a motion block, i.e., contains pixels representing motion in the image. As frames of the field of view 20 of the camera 12 are captured, these frames are processed by the processing unit 34 to determine if one or more moving objects 18 are present. To determine if one or more moving objects are present, appropriate processing is performed on the frames captured by the camera 12. A Gaussian mixture model is used to separate a foreground that contains moving objects from a background that contains static objects, such as trees, buildings, and roads. The images of these moving objects are then processed to identify various characteristics of the images of the moving objects. The module 62 determines whether the number of pixels whose intensity difference exceeds s·σ in each block exceeds a pixel threshold number, e.g., a percentage of the pixels, set at stage 112.

If at stage 122 the pixel threshold number is not exceeded, then the module 62 concludes that there is not a significant change and the block in question is not a motion block, and the process 110 proceeds to stage 124. At stage 124, the motion object counter module 62 decreases a motion block match count for the Gaussian model of pixels for the current block. The counter is preferably decreased by much more than one, e.g., by ten.

If at stage 122 the pixel threshold number is exceeded, and a value of a correlation between the background and the foreground block is less than a correlation threshold, set at stage 112, then the motion detection module 62 concludes that the block in question is a motion block and the process 110 proceeds to stage 126. Cross correlation reduces the influence of lighting shadows caused by a crowded field of view. False block matching can be reduced (or real matching caused by lighting fluctuation) in a uniform area, the standard deviation of each block is calculated to check the block's qualification for further cross correlation. Blocks with small standard deviations are discarded because error chances are much larger than blocks with large standard deviations. Short-term motion and long-term motion are detected based on the different short-term and long-term backgrounds.

Foreground Model Update

At stage 126, the motion detection module 62 determines whether each of the present blocks matches a previous corresponding block. The module 62 compares the pixel intensities of the present block with the same block from a previous image/frame. Foreground image blocks are detected through motion detection and are classified using foreground Gaussian mixture models. If there are many motions in the field of view 20 of the camera 12, the motion detection module 62 identifies whether a detected foreground image block is moving. The most probable foreground model, i.e., the model with the highest present motion block match count value, is considered as a candidate for a stationary object, e.g., a stopped person, stopped vehicle, stationary luggage, etc. The module 62 uses a sum of absolute difference (SAD) to measure similarity between a reference image block and the image model in the Gaussian models. If the present block does not match the previous block, e.g., the Gaussian model of the present block is not within an acceptable range of the Gaussian model of the previous image block, then the process 110 proceeds to stage 128 for that block. If the present block does match the previous block, e.g., the Gaussian model of the present block is within an acceptable range of the Gaussian model of the previous image block, then the process 110 proceeds to stage 130 for that block.

At stage 128, with blocks not matching previous blocks, the model of each of the unmatched blocks replaces the lowest possibility model for that block. The motion object counter module 64 produces a new match count for each unmatched block and associates this new count with the Gaussian model of the block. This new count and corresponding model replace the count with the lowest value for that block, and that count's corresponding model, such that the motion object counter module 64 maintains three counters for each block, each counter having a corresponding Gaussian model.

At stage 130, with blocks matching previous blocks, the match counters for these blocks are adjusted. The motion object counter module 64 increments, preferably by one, the match counter for the Gaussian model that matched the previous block. If the matched block matched a previous block that was in a frame that is N frames prior to the present frame, where N>1, then the match counter is preferably incremented by N instead of by one. The module 64 decreases the match count values for the two other two counters (i.e., corresponding to the models that did not match the previous block) that the module 64 maintains for each block.

At stage 132, the motion blocks are selected and a low pass filter is applied to the blocks. Small motions are ignored to reduce false alarms caused by relative movements between different parts of moving object.

Motion Pixel Grouping and Object Segmentation

At stage 134, motion pixels are analyzed for persistence. The object aggregation module 66 determines whether sets of motion pixels persist longer than a threshold time set at stage 112. For each motion pixel set of adjacent motion pixels that persists longer than the threshold time, the module 66 groups the pixels, labels the group, e.g., by numbering and/or naming the group, and stores the label in an object list.

At stage 136, an inquiry is made as to whether distances between groups in the object list are likely to be part of a single object. The object aggregation module 66 determines whether groups in the object list are separated by at least a threshold separation set at stage 112. For example, sometimes a single object appears to be two separate objects separated by a small distance, e.g., a pixel or two, due, for example, to noise in the image capturing and processing. If groups are not separated by more than the threshold distance, then at stage 138 the module 66 merges the groups and labels the merged group (e.g., with the label of one of the separate groups or with a new label). Once merging of groups is completed, with no groups separated by less than the threshold distance, the process 110 proceeds to stage 140.

At stage 140, very large and very small objects are removed from consideration for triggering a stopped object alarm. The stopped object analyzer module 68 applies a size filter to the objects in the object list. The size filter provides a size range of concern, which can be selected at stage 112, indicating a lower size below which objects are not of concern and indicating an upper size above with objects are not of concern. Any object not within the size range of concern is merged into the short-term and the long-term backgrounds by the background module 60 at stage 142 after a small-item threshold time or a large-item threshold time, respectively. The small-item threshold time is short so that merging of small objects into the background is done quickly. The small-item threshold time is much shorter than the large-item threshold time, which is relatively long such that merging of large objects into the background is done slowly. This helps to avoid missed detection of objects of concern, for example a person leaving a piece of baggage behind. The small-item and large-item threshold times are preferably set at stage 112. For objects within the size range of concern the process 110 proceeds to stage 144.

At stage 144, an inquiry is made as to whether the motion objects of sizes within the range of concern persist in the images for an alarm-candidate threshold time. The alarm-candidate time is less than an alarm-trigger time that, if an object of concern is stationary longer than, will result in an alarm being triggered. For example, the alarm-candidate time may be half of the alarm-trigger time. The alarm-candidate time and the alarm-trigger time are set during stage 112. The alarm-candidate time can be expressed in terms of the match count values, or vice versa. If the stopped object analysis module 68 determines that no object persists beyond the alarm-candidate time, then the process 110 returns to stage 120. If the stopped object analysis module 68 determines that any object persists beyond the alarm-candidate time, then the process 110 proceeds to stage 146.

Alarm Trigger and Merge to Background

At stage 146, an inquiry is made as to whether any alarm-candidate motion object (i.e., within the range of concern and persisting longer than the alarm-candidate time), is duration-qualified motion. The stopped object analysis module 68 compares the current frame (or at least the qualified motion objects or blocks with any portion of a qualified motion object) with the short-term and long-term backgrounds. This provides information as to whether the motion is short-term motion or long-term motion. This information can be used to determine, for example, whether there is a newly-stopped object or a previously-stopped object that has now moved. An alarm-candidate motion object has qualified motion only if there is both short-term and long-term motion of the alarm-candidate motion object, that is, that the current frame differs from both the short-term background and the long-term background. If there is no duration-qualified motion, i.e., the current frame differs from neither or only one of the short-term and long-term backgrounds, then the process 110 proceeds to stage 142 where the present frame is merged into the short-term or long-term background after a short-term or long-term background update period, respectively. If there is duration-qualified motion, i.e., the current frame differs from both the short-term and long-term backgrounds, then the process 110 proceeds to stage 148.

At stage 148, the stopped object analysis module 68 determines whether the duration-qualified motion is magnitude-qualified motion. The module 68 determines whether the duration-qualified motion is small, i.e., not magnitude qualified, or not small, and thus magnitude qualified. This helps determine whether the duration-qualified motion is a slight movement of an existing object, and thus not worthy of triggering an alarm. This helps avoid triggering an alarm multiple times for stoppage of an object followed by slight movement of the object. The stopped object analysis module 68 performs a bitwise AND of the current frame and a binary "dwell motion image" of the foreground pixels that are stationary beyond the alarm-candidate time. The stopped object analysis module 68 also performs a bitwise AND of the short-term background image and the binary dwell motion image. The stopped object analysis module 68 calculates histograms of the two resulting images (of the two AND operations) and calculates a difference D of the two histograms. If the difference D is greater than a small-motion threshold, then the module 68 considers the motion to be small and the process 110 proceeds to stage 142 where the current frame is merged into the short-term or long-term background after a short-term or long-term background update period, respectively. If the difference D is less than the small-motion threshold, then the module 68 considers the motion to be large and thus of concern, indicating stoppage of concern of an object of concern, and the process 110 proceeds to stage 150.

Thus, if the object 18 enters the field of view 20, initially the object 18 will not be part of either the short-term background or the long-term background. If, however, the object 18 stops and remains still for longer than the short-term or long-term background update period, then the object 18 is merged into the appropriate background image.

At stage 150, every enabled zone of the current image is scanned. The stopped object analysis module 68 scans every zone selected at stage 112 as a zone in which a stopped object should trigger an alarm. For example, the user can specify multiple zones within the field of view 20 of the camera 12 for which stopped objects are of concern.

At stage 152, the stopped object analysis module 68 determines whether an objected is stopped in any zone longer than an alarm-trigger time for that zone. The alarm-trigger time is provided/set during stage 112 and may be different in different zones. For example, a no-parking zone of an airport road may have a shorter alarm-trigger time than a "loading and unloading" zone of the airport road. The alarm-trigger time can be expressed in terms of the match count values, or vice versa. If the module 68 determines that an object is stopped within a zone longer than the corresponding alarm-trigger time, then the process 110 proceeds to stage 154 where an appropriate alarm is triggered. The alarm may be generic to all zones, may not specify the zone, or may specify the zone. If the module 68 determines that no object is stopped within a zone longer than the corresponding alarm-trigger time, then the process 110 ends at stage 156.

Alternative Configurations

Other examples of configuration (including implementations) are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Still further configurations are possible. For example, the process 110 could be modified such that blocks may be designated for motion analysis by user at stage 112, and only designated/selected blocks are searched at stage 120, with stages 150, 152, and 154 being eliminated. As another example of a different configuration, a user may select only areas of concern for analysis. Further, while Gaussian models of image pixel intensities were described, other pixel models could be used. Further still, while a size range of concern was described above, it is possible not to provide a size range filter, or to provide a filter with only a lower bound or only an upper bound for sizes of concern.

Further, more than one invention may be disclosed.

What is claimed is:

1. A video surveillance system comprising:
an input configured to receive indications of images each comprising a plurality of pixels;
a memory; and
a processing unit communicatively coupled to the input and the memory and configured to:
analyze the indications of the images;
compare a present image with a short-term background image stored in the memory;
compare the present image with a long-term background image stored in the memory;
determine that a motion of an object in the present image is duration-qualified motion in response to the object in the present image being disposed in a first location in the present image, in a second location in, or absent from, the short-term background image, and in a third location in, or absent from, the long-term background image, wherein the first location is different from both the second location and the third location; and
provide a stopped-object indication in response to the object with duration-qualified motion being stopped in a zone longer than an alarm-trigger time for that zone.

2. The system of claim 1 wherein the processing unit is further configured to:
update the short-term background image using the present image in response to lack of motion in images during a preceding short-term time threshold; and
update the long-term background image using the present image in response to lack of motion in images during a preceding long-term time threshold.

3. The system of claim 1 wherein the processing unit is configured to actuate an alarm in response to the stopped-object indication only if the object is larger than a size threshold.

4. The system of claim 1 wherein the processing unit is configured to actuate an alarm in response to the stopped-object indication only if the object is within a size range.

5. The system of claim 1 wherein the processing unit is configured to actuate an alarm in response to the stopped-object indication only in response to the first location being different from each of the second location and the third location by at least a movement threshold.

6. The system of claim 1 wherein the system is a camera, the camera further comprising a video capture device configured to convert reflected light into the indications of the images, and wherein the input is communicatively coupled to the video capture device to receive the indications of the images from the video capture device.

7. The system of claim 1 further comprising a user interface communicatively coupled to the processing unit and configured to provide an alarm in response to the stopped-object indication.

8. A video surveillance method comprising:
receiving indications of images each comprising a plurality of pixels;
analyzing the indications of the images;
comparing a present image with a short-term background image stored in the memory;
comparing the present image with a long-term background image stored in the memory;
determining that a motion of an object in the present image is duration-qualified motion, in response to the object in the present image being disposed in a first location in the present image, in a second location in, or absent from, the short-term background image, and in a third location in, or absent from, the long-term background image, wherein the first location is different from both the second location and the third location; and
providing a stopped-object indication in response to the object with duration-qualified motion being stopped in a zone longer than an alarm-trigger time for that zone.

9. The method of claim 8 further comprising:
updating the short-term background image using the present image in response to lack of motion in images during a preceding short-term time threshold; and
updating the long-term background image using the present image in response to lack of motion in images during a preceding long-term time threshold.

10. The method of claim 8 wherein the processing unit is configured to actuate an alarm in response to the stopped-object indication only if the object is larger than a size threshold.

11. The method of claim 8 wherein the processing unit is configured to actuate an alarm in response to the stopped-object indication only if the object is within a size range.

12. The method of claim 8 wherein the processing unit is configured to actuate an alarm in response to the stopped-object indication only in response to the first location being different from each of the second location and the third location by at least a movement threshold.

13. A computer program product residing on a non-transitory processor-readable medium and comprising instructions configured to cause a processor to:
receive indications of images each comprising a plurality of pixels;
analyze the indications of the images;
compare a present image with a short-term background image stored in the memory;
compare the present image with a long-term background image stored in the memory;
determine that a motion of an object in the present image is duration-qualified motion, in response to the object in the present image being disposed in a first location in the present image, in a second location in, or absent from, the short-term background image, and in a third location in, or absent from, the long-term background image, wherein the first location is different from both the second location and the third location; and provide a stopped-object indication in response to the object with duration-qualified motion being stopped in a zone longer than an alarm-trigger time for that zone.

14. The computer program product of claim 13 further comprising instructions configured to cause the processor to:
update the short-term background image using the present image in response to lack of motion in images during a preceding short-term time threshold; and
update the long-term background image using the present image in response to lack of motion in images during a preceding long-term time threshold.

15. The computer program product of claim 13 further comprising instructions configured to cause the processor to actuate an alarm in response to the stopped-object indication only if the object is larger than a size threshold.

16. The computer program product of claim 13 further comprising instructions configured to cause the processor to actuate an alarm in response to the stopped-object indication only if the object is within a size range.

17. The computer program product of claim 13 further comprising instructions configured to cause the processor to actuate an alarm in response to the stopped-object indication only in response to the first location being different from each of the second location and the third location by at least a movement threshold.

* * * * *